US008554938B2

(12) United States Patent
Mittal

(10) Patent No.: US 8,554,938 B2
(45) Date of Patent: Oct. 8, 2013

(54) WEB BROWSER PROXY-CLIENT VIDEO SYSTEM AND METHOD

(76) Inventor: Millind Mittal, Palo Alto, CA (US)

( * ) Notice: Subject to any disclaimer, the term of this patent is extended or adjusted under 35 U.S.C. 154(b) by 258 days.

(21) Appl. No.: 13/007,025

(22) Filed: Jan. 14, 2011

(65) Prior Publication Data
US 2012/0054616 A1    Mar. 1, 2012

Related U.S. Application Data

(60) Provisional application No. 61/378,764, filed on Aug. 31, 2010.

(51) Int. Cl.
*G06F 15/16* (2006.01)
(52) U.S. Cl.
USPC ........... 709/230; 709/231; 709/248; 715/722; 715/700
(58) Field of Classification Search
USPC .................................................. 709/231–232
See application file for complete search history.

(56) References Cited

U.S. PATENT DOCUMENTS

2007/0299983 A1* 12/2007 Brothers ....................... 709/231
2010/0281105 A1* 11/2010 Sebastian ...................... 709/203

* cited by examiner

*Primary Examiner* — Abdullahi Salad
(74) *Attorney, Agent, or Firm* — Stephen E. Zweig

(57) ABSTRACT

Method of controlling playback of Internet web page video on remote or high quality video displays using a remote control device, such as a smart phone. The method runs a first client browser on the remote control device, which in turn sends commands to a proxy browser with a data buffer. In response to user commands from the remote control device, the proxy browser retrieves and buffers video and non-video web page data from Internet servers, and sends this data to the remote control device. Upon user command, the proxy browser also sends selected buffered data to a second client browser that is connected to the remote or high quality video display. Media player playback commands on the remote control are echoed to a second media player on the second client browser, resulting in good synchronization between devices. Various compression, IP address adjustment, and public key methods are also discussed.

33 Claims, 4 Drawing Sheets

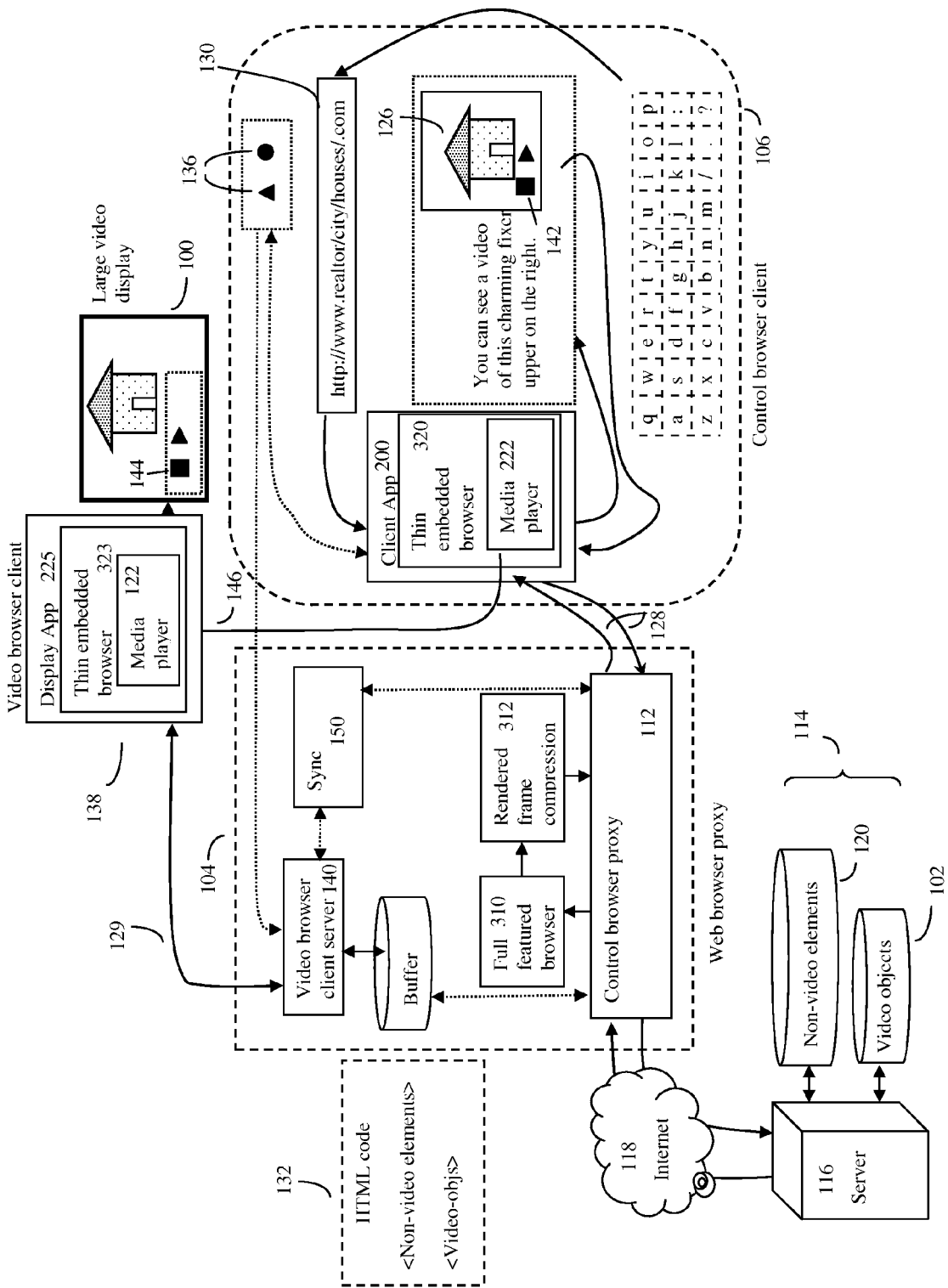

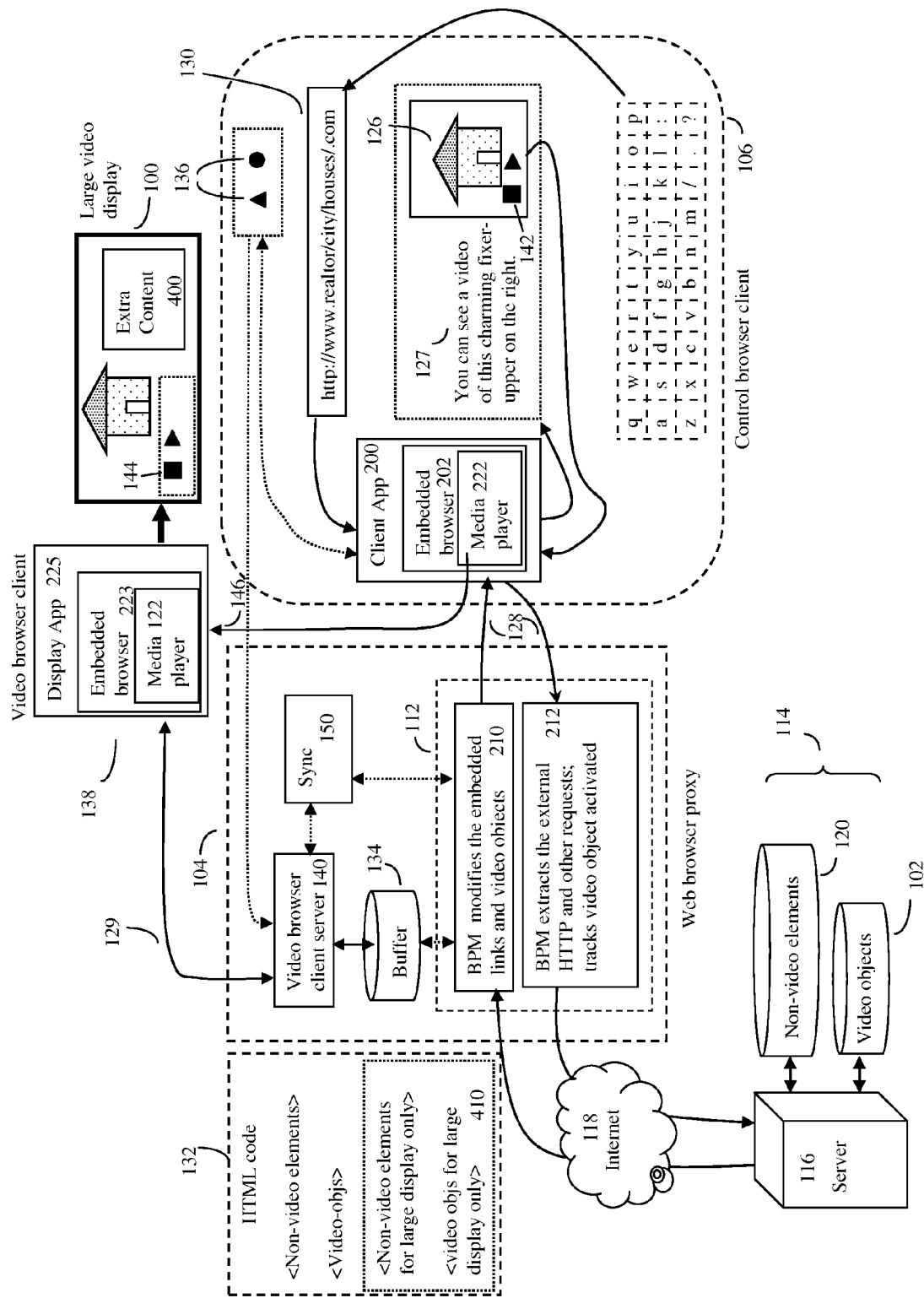

WEB BROWSER PROXY-CLIENT VIDEO SYSTEM AND METHOD

CROSS REFERENCE TO RELATED APPLICATIONS

This application claims the priority benefit of provisional application 61/378,764 "Content Router for Home Networks", filed Aug. 31, 2010, inventor Millind Mittal; the contents of which are incorporated herein by reference.

BACKGROUND OF THE INVENTION

1. Field of the Invention

The invention is in the general field of Internet based video.

2. Description of the Related Art

In recent years, a growing amount of video content has been added to the web (Internet). In addition to quantity, as available Internet bandwidth has increased, computer processing power improved, and storage capacity has grown, the quality of the video content has also improved. For example, in addition to lower quality compressed video, high definition video is now routinely available on many websites.

In addition to technical improvements, video production values have also improved. Although originally much Internet video was produced by amateurs, increasingly professionally produced videos made according to high production standards are also appearing on the web. This includes various news and entertainment oriented websites, such as cnn.com, and espn.com.

As a result, although web based video was originally intended as a low resolution media for small computer screens, increasingly internet video is now produced in formats that are suitable for large high quality video screens, such as the large (e.g. 22 inch or greater) video screens commonly used in living rooms, bed rooms, and business conference rooms.

At the same time however, web based video is often presented in the context of a web page, embedded along with text and various other images. Thus often a web page, for example, will have many lines or columns of text, various static images or drawings, and often a frame or region in which the video may be viewed (usually with an embedded video media player) within the context of the overall web page graphical layout.

For a user it is often both more personal and convenient to first browse the web pages on a smaller computerized device and then, only when watching or sharing the video, have the video portion of the web content projected or mirrored onto a larger video screen or television (TV). This is because TV, which is typically a shared viewing medium, located at least several feet away from the viewer, is generally less suitable for browsing.

Prior methods typically promoted browsing as well viewing on the same screen (one screen). For example, a user browsing as well as viewing video on a desktop, notebook or another hand-held device, or a user browsing and viewing video on a TV (e.g. WebTV, Google TV etc).

More recently there have been some methods proposed that compress the frame buffer display of the video portion of a computerized device (often a handheld computerized device or notebook computer) internally, and then send the compressed frame buffer data to out TV using a wireless protocol, where the compressed frame buffer data is then decompressed and displayed to television. This solution can also be used to enable a dual screen paradigm for consuming web content, where the web text is read on a smaller device close to the viewer and the web video, typically along with the rest of the content of the web page, can be done on a larger and more distant TV or other video monitor. One example of such technology is Wireless Display (WiDi) technology from Intel Corporation.

One drawback of this type of technology, however is that it requires the hand-held client device or a note book computer device to include this new and non-standard frame buffer compression technology, which presents critical cost and business challenges. In particular, because this capability often requires new and non-standard circuitry, it generally cannot be supported on existing (legacy) systems. Additionally, since these compression methods generally require both specialized computationally intensive processing, these methods are generally not suitable for present day low power hand-held devices. These methods also generally require an adaptor on the TV side to convert the compressed WiDi data to a video (e.g. HDMI) signal format suitable for output for standard television devices.

In addition to the WiDi methods discussed above, there have been other proposed methods that, instead of compressing the video frame buffer of a hand-held or note book device internally (inside the device), take a display port or VGA output of the device, compress it and then transmit the output an HDMI adaptor (typically a wireless adaptor) connected to the TV. This solution also presents cost and business challenges because it also requires additional circuitry. These methods generally require the hand-held device both offer the display output through an external connector and additionally requires an external HDMI adaptor connected to the TV, and this additional circuitry adds extra cost.

Remote Control Methods

Typically users displaying video on large screens, again such as living room, bed room, and business conference room screens, have a desire to control the video viewing experience using various remote control methods.

One common option is to use standard infrared remote controls, which are typically handheld controllers with multiple control buttons (e.g. channel selection, volume control, input selection, video adjustment, and so on) that are commonly present in almost all households. Such controllers originated in a pre-web era, however, when users were not expected to easily input more complex data, such as web page uniform resource locators (URL) data, and are often not well suited for the more demanding job of managing the remote presentation of web page embedded video.

However, as small handheld devices such as WiFi capable smart phones have proliferated, exemplified by the popular iPhone and Android series of phones, and also including WiFi capable non-cell phone devices such as the Apple iPod touch and iPad, the desirability of using these small handheld devices as WiFi (or infrared) based remote control devices has become apparent. These smart phones and related devices typically have at least one computer processor (often of limited computing capability due to battery power constraints), a small video display, and either a touch sensitive screen based user interface, and/or a button based user interface. These more sophisticated types of interfaces allow users to enter in more complex commands, such as web page URL data, using real or virtual (e.g. software rendered on a touch sensitive screen) keypads.

For example, various applications (app) programs exist for the Apple iPhone, iPad, or iPod, such as the iTunes remote application, that allow users to control the playback of video on large screen TVs using dedicated Internet video systems such as Apple TV. However these systems generally rely upon specialized web content, such as Apple iTunes, that have been customized for this type of system, and thus these systems are often not well suited for typical web pages.

In the case of a typical web page with mixed text, images, and embedded video, the problems of using a small handheld device to remotely control the web page and control the playback of selected regions of the web page that have embedded video should be appreciated. A typical web page, with all of its associated text and graphics, will generally render too small an image on the handheld remote control, thus requiring much zooming and resizing in order to find the right section of embedded video and the associated remote controls, as well as much expenditure of limited onboard processing power and bandwidth to do this zooming. At the same time, the web page, if literally reflected onto the large and more distant video screen (for example, a Television—TV), is generally harder to read from a distance, and is also more difficult to manage.

BRIEF SUMMARY OF THE INVENTION

The invention is based on the insight that the viewing of typical web page embedded video media on large video screens (again such as living room screens, bedroom screens, and business conference room screens) would be facilitated by providing a solution that provides for a seamless dual screen viewing experience—that is one where a user is able to browse a web site on a local screen (and thus have a more user friendly experience for reading text), start watching a video of interest embedded in the current web page on his or her hand-held screen, and then, if desired, project the video onto the larger and more distant video screen just by simple touch of one or more controls on the hand-held device, or by a specific hand stroke on devices with touch sensitive screens. In such a system it is often desirable to have an option to allow the video to continue playing on the TV from the current scene of the video at the point of selection of projection control, instead of restarting the projected video stream from the beginning. Additionally it is often also desirable, though not necessary, that the projected video continue to play locally as well. This option allows the user to control the projected video play back and, for example, to use various pause, fast forward, and mute controls located on the user's handheld device for this control. In some uses it may also be desirable to have option to start playing the video on the more distant large display, after the user has decided initiate projection of the video to the distant large screen, from the beginning of the video.

Further, the invention is also based on the realization that such an improved video control system might also facilitate use of web-based rich or enhanced video content, such as embedded 3 dimensional (3D) video media. This is because large 3D video screens for living rooms, bedrooms, and business conference rooms, where the use of 3D viewing goggles is tolerable, are starting to become popular. By contrast, the use of 3D video screens for small hand held devices, such as smart phones, is likely to continue to be problematic for the foreseeable future due to the generally lower user toleration of wearing 3D viewing goggles for handheld devices. Additionally, the smaller video displays on such handheld devices typically lack 3D capability. Thus improved seamless methods to turn over the playback of web page embedded video from smaller devices to larger 3D capable video screens will generally promote a greater use of web page embedded 3D video, at least as an alternate media source.

Thus in some embodiments, the invention may be a method of controlling playback of Internet web page video on remote or high quality video displays using a remote control device, such as a smart phone. The method runs a first client browser on the remote control device, which in turn sends commands to a web browser proxy with a data buffer. In response to user commands from the remote control device, the proxy browser retrieves and buffers video and non-video web page HTTP code and video file data from Internet servers, and sends this code and data to the remote control device. Upon user command, the web browser proxy also sends selected buffered code and data to a second client browser that is connected to the remote or high quality video display.

In some implementations, video file data optimized for displaying on the distant large video display may be directly accessed by the second client browser from the Internet. Media player playback commands on the remote control are echoed to a second media player on the second client browser, resulting in good synchronization between devices. Various compression, IP address adjustment, and public key methods are also discussed.

BRIEF DESCRIPTION OF THE DRAWINGS

FIG. 3 shows some additional details of a browser proxy-client system and method, where rich media or media with security issues may be safely run on thin (limited functionality) control browser clients by pre-rendering web pages on a more full featured browser in a web browser proxy, compressing the resulting images, and then sending the compressed images to the thin control browser client, which in turn may decompress and display the rich media.

FIG. 4 shows another additional detail of a browser proxy-client system and method, where web sites optimized for viewing by such a system and method provide added HTML code containing additional media (such as advertisements) that may be optimized to be rendered on the larger video display only when part of the content rendered on control browser client is projected or mirrored on to larger video display.

DETAILED DESCRIPTION OF THE INVENTION

Figure 1:
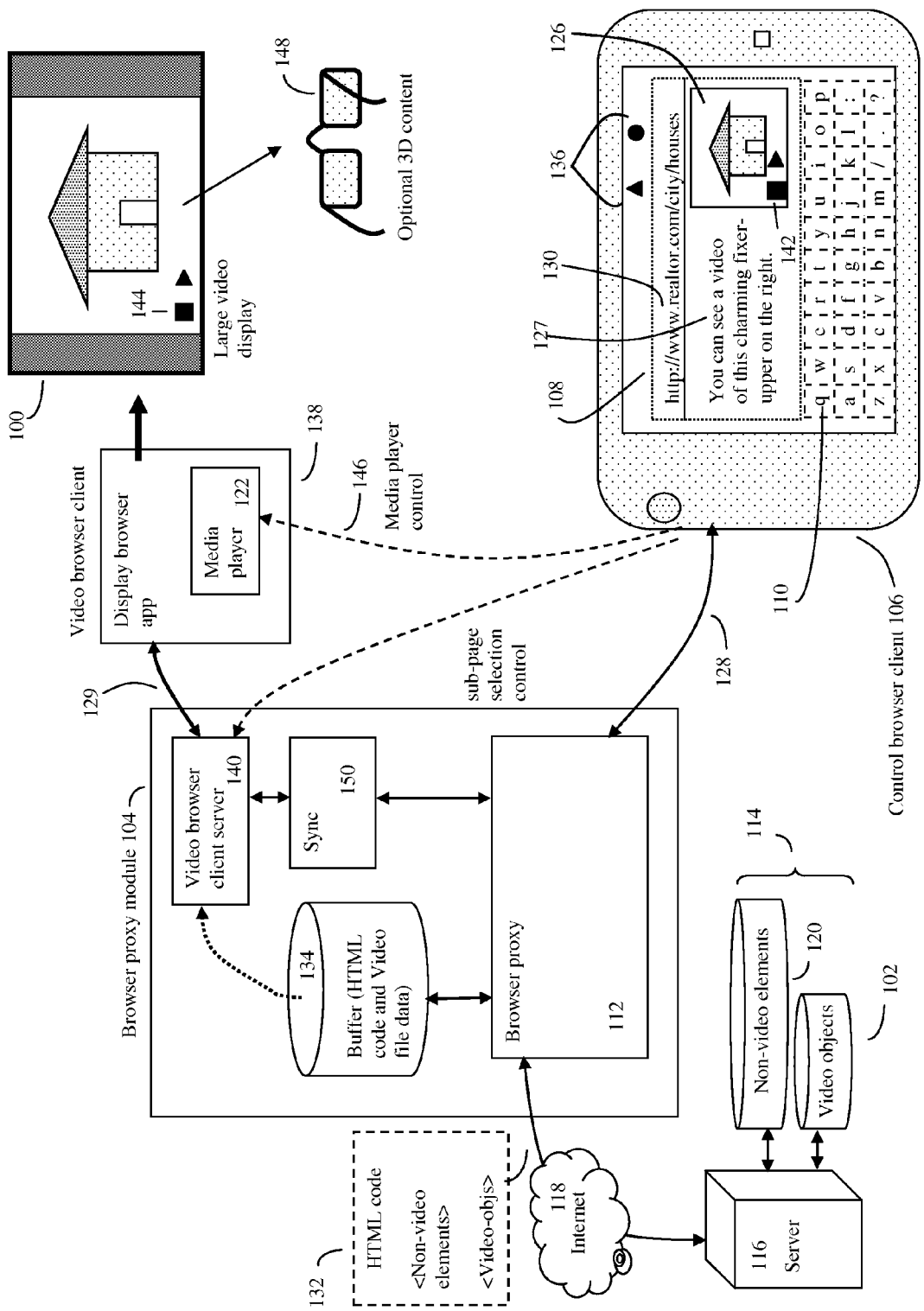
FIG. 1 shows an overview of how a small handheld computerized device, such as a smart phone, may control the playback of web and web video content on a separate larger video display.

FIG. 1 shows an overview of how a small handheld computerized device, such as a smart phone (here called a control browser client) (106), may precisely control the playback of web and web video content on a separate larger video display (100). In addition to being a smartphone, such a handheld computerized device may alternatively be a tablet PC, netbook or even a notebook computer.

In one embodiment, the invention may be a method of implementing and controlling a video display (100) for the purpose of displaying at least selected portions of various Internet video programs (102) that are presented in the context of web pages (132). The method controls the video display by way of a web browser proxy (104), which may in turn playback selected Internet content, such as video, on larger video displays by way of synchronized media players running in a second client browser, here referred to as a video browser client (138). This video browser client is in turn often connected to the larger or higher quality video display (100). The web browser proxy (104) may consist of multiple software and hardware modules. Some of the primary web browser proxy modules are: 1) a control browser proxy (112), which may be a browser proxy for the embedded browser in control browser client (106); 2) a video browser client server (140), which may be a HTTP server for handling requests from video browser client (138); 3) sync (150), which may be a software module to synchronize video playback by the embedded medial player in the control browser client (106) and the media player embedded in the video browser control (138); and 4) a HTML code and video file and other data buffer (134) to buffer the modified HTML code, video file(s) and other data.

Media player playback commands on the remote control (106) are echoed to a second media player (122) on the video browser client, resulting in good synchronization between the devices.

The video browser client (138) may be embedded on a hardware platform that is separate from the hardware platform (106) that houses the control browser client, and may, for example be embedded as a module of the video display (100). The web browser proxy (104) also may often be implemented as either a separate hardware platform (104) different from the platform housing the control browser client (106) or the video display (100), or it too may be embedded as a module of the video display (100). In some implementations, however, the web browser proxy (104) may be embedded in the same hardware platform as that of control browser client (106).

The video display (100) and the control browser proxy (112) will often be controlled by a handheld control browser client, often embedded in a portable handheld computerized device (106), such as a smart phone, tablet computer, or dedicated remote control device. Here a smart phone, such as an Apple iPhone, Android smart phone, or other handheld device with Internet capability, a graphical user interface (e.g. a bit-mapped small video display (108), touch sensitive screen (108), onboard mouse, trackball and the like, and an optional real or virtual keypad (110)) will often be used as a specific example.

In one embodiment, the invention may use the control browser proxy (112) to obtain HTML code for the web page (114) (132) from one or more Internet web page servers (116) over the Internet (118). Often this HTML code for the web page will consist of a mixture of non-video elements, such as HTML tags encoding graphics, text, images, and the like (120), and video objects, such as flash, HTML5 encoded video, various video files such as AVI, MPEG, MP4, WMV, FLV, QT, SWF, and the like. These video files (120) will often be played back in a typical web browser by way of one or more media players (122) (222) (e.g. media player software such as Microsoft Media player, Apple QuickTime, Realplayer, DivX Players, and the like), and indeed each different video object may be linked to a preferred media player for that particular object.

Often the web browser proxy (104) and control browser proxy (112) will be relatively immobile, and be incorporated into a multi-function or stand-alone box (e.g. a set top box), or video monitor (100) which in turn will be connected to the Internet (118). The web browser proxy (104) will typically consist of at least one computer processor (often an x86, MIPS, or ARM based processor), suitable memory (e.g. RAM, Flash, hard drive, etc.), optional graphics rendering components, and a wired or wireless Internet connection (e.g. an Ethernet connection, a WiFi connection) to the Internet (118), as well as suitable input and output connections—e.g. network connections, suitable Bluetooth, Infrared, connections, and so on. The web browser proxy (104) in turn may be controlled by suitable operating system software, such as Linux, embedded windows, iOS, Android, and the like.

The methods of the present invention will typically be implemented in the form of various software modules, often running code for various browsers or portions of browsers, as well as media player software, IP translation software, "glue" or synchronization software, graphical user interface software, and other software modules to be described.

Figure 2:
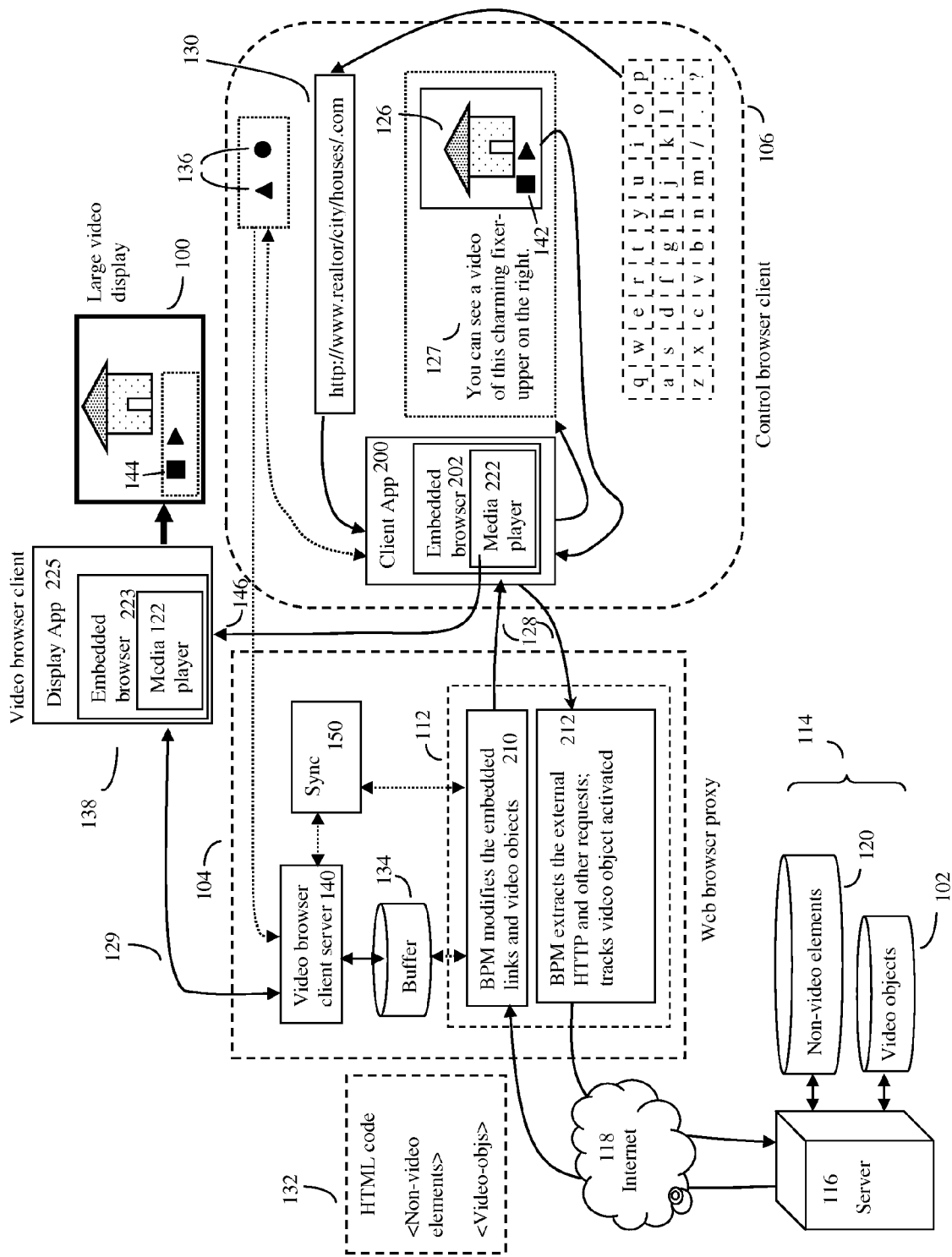
FIG. 2 shows some additional details of the HTML code modification process used by the invention to ensure that the HTTP requests originated by control browser client (which may run on a small handheld computerized device such as a smart phone) or video browser client (which may in turn playback selected Internet content, such as video on larger video displays by way of synchronized media players) pass through the web browser proxy and control browser client.

In operation, a user will typically control the browser proxy software (112) and web browser proxy (104) by use of a control browser client (106), that itself often runs under the control of a software application (e.g. FIG. 2 (200)) that may include an embedded browser (202) running on a small handheld computerized device (106) as previously described. The user will typically use the graphical user interface (108), (110) of the control browser client to view a portion of a web page (126, 127), often containing video of interest (126), and use the control browser client (106) to send user commands using the communication interface (128) to the control browser proxy (112) to obtain HTML code corresponding to the web page pointed by the URL (114), (130) of interest from an Internet web page server (116). In these examples, we will assume that this HTML code (132) for the web page is composed of both non-video (web) elements (120) and video objects (102) as previously described.

Upon receiving the user commands, such as an HTTP request to fetch the HTML page pointed by the URL (130) on communication interface (128), the control browser proxy (112) will generally request the appropriate HTML code (again here assumed to be a mix of non-video elements and video objects) from the Internet server (116). For the case where control browser proxy (112) is in a separate hardware platform, in order to ensure that the web requests corresponding to the selection of any embedded links requested by the control browser client (106) comes back to the control browser proxy (112) again, the control browser proxy (112) may optionally modify some or all of the various embedded links in the HTML code for the web page by suitably prepending the web browser proxy's (104) own IP address prior to passing on the returned HTML code to the control browser client (106). Control browser proxy (112), upon receiving future requests due to selection of an embedded link with its own IP address, then resolves the external URL associated with the request using an Internet Domain Name Server (DNS) and creates a request to target web address. This process will be described in more detail later.

Upon receiving the requested mix of non-video elements and video objects, the control browser proxy (112), will take the HTML code for the web page (132), and then often process the non-video elements (120) using a first non-video elements processing protocol, and process the video object (102) data using a first video objects processing protocol, producing processed non-video elements and processed video objects.

Various types of first non-video elements processing protocols and first video objects processing protocols can be used. These protocols can include simple modification of the embedded links in the HTML code to insure that the data is properly addressed by the control browser proxy (112). Other processing protocols can include storing the data in various memory buffers (134), as well as pre-rendering without compression, pre-rendering with compression, and, particularly for the video objects file data (102), potential compression into a more memory and bandwidth efficient form, such as a video form that uses a smaller number of bytes per second to render video. Some protocols may also automatically request higher resolution video and/or 3D video from the server (116). These various protocols will be described in more detail shortly.

After suitable IP address modification, the control browser proxy (112) will send (128) the processed non-video elements and processed video objects to the control browser client (106), either by a direct wireless protocol such as WiFi, Bluetooth, and the like, or through the Internet again.

At the control browser client (106), which again will often be a small handheld computerized device such as a smart phone (but also can be a note book, tablet PC, netbook or any other computerized device), the control browser client (106), again running under the control of suitable applications software (see FIG. 2 (200)), embedded browsers (202), and media players (222) will generally render this processed data into a visual form, often resembling the original web page (126) (127), on the control browser client (106).

The human user may then view this web page, and use the control browser client (106) to, in turn, accept user commands (often by either pressing a rendered web page video section (126) of a touch sensitive graphical user interface screen (108), typing on a real or virtual keyboard (110), or pressing suitable selection controls (136)). The user commands will often be used to select sections of video (126) or non-video (127) from the web page. One of the graphical user interface selection controls (136) may be used to enter in the user's intent of projecting the currently playing video in the control browser client (106) to the video display (100). This can be achieved through the system's knowledge of what video (126) is currently playing on the media player (222) running within the control browser client (106). This "project currently playing video" functionality may be realized by transmitting back these user video projection and control commands to the web browser proxy (104), and/or the video browser client (138), and/or the video browser client server (140).

The control browser proxy (112), often aided by the memory buffer (134), video browser client (138), media player (122) and other web browser proxy (104) modules will then process (for projection) these selected non-video elements (127), (120) or video objects (126), (102), often by a second set of protocols.

Various types of second non-video elements processing protocols and second video objects processing protocols can be used. Here often the selected non-video elements (127), (120) and video objects (126), (102) will be residing in memory buffer (134) at this point, since this data has been previously fetched for the benefit of the user operating the control browser client (106). The second non-video elements processing protocols and second video objects protocols will often involve protocols involving the video browser client (138), media player (122) and video browser client server (140). For example, as will be discussed in more detail shortly, these protocols may often instruct a browser embedded in display browser application—display browser app (225) in FIG. 2—in video browser client (138) to in turn request the video browser client server (140) using the communication interface (129) between the two to fetch the selected code or data from the buffer (134). The video portion (102) of this selected data may then be played in media player software (122) and displayed on the large video display (100). In some implementations, video browser client server (140) may fetch video file data from the web server (116) by sending the request out to Internet (118) directly and not from the buffer in the browser proxy. This is particularly useful in case when the format or resolution of the video file needed for rendering on the large video display (100) is different from the format or resolution of the video file for rendering on control browser client (106), and video browser client server (106) module of web browser proxy (104) is implemented in the same hardware platform as video browser client (138) while other modules of the web browser proxy (104), including control browser proxy (112) are implemented in the same hardware platform as that of control browser client (106).

Note that the video browser client (138) may itself consist of a microprocessor, memory, software, suitable network connections, graphics rendering circuitry, and often conversion circuits to convert the rendered images and sound into video, such as various audio and video connectors (e.g. RCA connectors, component video connectors, S-Video connectors, HDMI connectors, and the like).

In some embodiments, the video browser client (138), rather than being physically separate from the web browser proxy (104), may be physically be a part of the web browser proxy (104). In any event, as a result of the user commands (for example, selecting the video (126) by pressing on a touch sensitive screen (108), and then selecting a "project button" using the selection controls (136), the system will instruct the web browser proxy (104) and video browser client (138) to start rendering and transmitting the selected data, such as the video, to the large video display (100).

As previously discussed, in some embodiments, once the various non-video elements (120) and video objects (102) have been fetched from the server (116) by control browser proxy (112), often it will be useful to store these objects in a memory buffer (134), containing addressable computer memory such as RAM, Flash, disk drive, or other memory type. This is because once the user selects part or all of the web page for viewing or projection on the large video display (100), the same data need not be re-obtained from server (116). Rather, the same data, upon request form the video browser client server (140), can be instantly obtained from the memory buffer (134) without Internet transmission lags, rendered into a visual or moving image by the video browser client (138) (often with the aid of media player software (122)), and projected on video display (100). In some implementations, the video browser client server (140) may fetch video file data from the web server (116) by sending the request out to the Internet (118) directly and not from the buffer in the web browser proxy (104). Here the sync module (150) may still be utilized to achieve proper synchronization between the display of the video on the video browser client (138) and the control browser client (106).

FIG. 2 shows some additional details of the IP address modification and data flow between various modules, such as the web browser proxy (104), control browser client (106) (which again may run on a small handheld computerized device such as a smart phone), and the video browser clients (138) which may in turn playback selected Internet content, such as video on larger video displays by way of synchronized media players (122), (222).

In this type of embodiment, often the control browser client module (106) will render at least the processed video objects in the graphical user interface (108) of the control browser client, again often with the use of a first video media player (See FIG. 2, 222), which in turn may be called by an embedded browser (202) working within a client application (200), such as a smart phone application. Thus for example, the entire control browser client (106) could simply be an client application (200) with embedded browser (202), and the media player(s) (222) running over the iPhone, Android or another smart phone's operating system in a smart phone.

In this case, the embedded browser (202) within the client app (200) on a smart phone (106) can render a web page (126, 127). The user, selecting the suitable control (136), can pick out what elements of the web page (i.e. text, graphics, video) that he or she wants to project, and the client app (200) can transmit (128) the user selection back to the web browser proxy (104). For example, assume that a real estate web page is being played, and the user sees a video showing a walk-through of a house of interest (126), which is being played on a first video media player (222). The user can select this video (126) by, for example, touching the video in a touch sensitive display (108) to start playing on the display associated with the control browser client (106). At this point the media player specified by the selected video object (222) sends a request out to web server to fetch the video file and starts playing. Since the path of the video file is modified to include the IP address of the control browser proxy (112), the file read request first goes out to the control browser proxy (112). Knowing the video file being accessed, the control browser proxy (112) examines the HTML code and determines which of the video objects is active on the control browser client. The control browser proxy (112) can then make this active video object reference available to the video browser client server (140). In case the user further selects additional selection controls (136), the user selection data can be sent to the appropriate video browser client server (140) and/or the video browser client (138). The display application (or display app) (225) presents either a link to the video object to be played to the display embedded browser (223), or on its own fetches the selected video object and presents it to the display embedded browser (223). In case the link is presented, the display embedded browser (223) issues an HTTP request to the video browser client server (140) to provide the HTML code corresponding to the active video object to process. As part of the processing of the active video object, the media player (122) in video browser client (138) issues a read request for the video file data, which, due to pre-pending of the request path with the IP address of the video browser client server (140) (explained further below), which can satisfy the request using the buffered (134) copy of the same video. Often this second video media player (122) may be the same type (i.e. the same software version) as the first video media player (222), and as a result, the position of the various video media player controls (e.g. stop, go, forward, reverse, freeze, etc.) will be mappable from the first video media player (222) to the second video media player (122). That is, the coordinates of a control (142) on the first video media player (222) will be in the same relative position (144) on the second media player (122).

In some implementations, the video browser client server (140) may fetch video file data from the web server (116) by sending the request out to the Internet (118) directly and not from the buffer in the browser proxy. This method is particularly useful in cases where the format or resolution of the video file needed for rendering on the large video display (100) is different from the format or resolution of the video file needed for rendering on the control browser client (106). This method is also useful in cases where the video browser client server (106) module of the control browser proxy (104) is implemented in the same hardware platform as the video browser client (138), and/or where some or all of the other modules of the control browser proxy (104) are implemented in the same hardware platform as that of control browser client (106).

In one embodiment, the HTML code and any associated data files requested by the control browser client (106) may be accessed though the control browser proxy (112). This is done so that the accessed data can be buffered by the control browser proxy (134) and then this same data can be used to render the selected data by the video browser client module (138). Additionally by providing the HTML code to the control browser proxy (138), the system can also get good control over what subset of the web page data is projected on the larger video display (100).

Operation of the Browser Proxy:

Routing of the control browser client (106) HTTP requests through the control browser proxy (112) is accomplished by modifying the URL that is ultimately presented to the embedded browser (202) within the client app (200). To do this, the user typed URL (130) may be modified to prepend a different URL address to the IP address of the web browser client (106). For example, let us assume that the web browser proxy (104) has an IP address of 192.168.0.10. Also assume that the system is looking at a website with a URL www.realtor.com, which has both non-video elements and video objects. In this case, the client app (200) instead of issuing an HTTP request for www.realtor.com issues the HTTP or https request to 192.168.0.10/www.realtor.com (or alternatively the request may use a different demarcation to other than "." used within the original URL). This results in an HTTP request being sent to the control browser proxy (112) with the HTTP message providing the remainder of the path, i.e. www.realtor.com as the data within the HTTP message. Module 212 then in turn resolves the IP address for the web server addressed by URL www.realtor.com and issues a request to the server (116) over the internet.

As an example, let us assume that the targeted web page has both non-video HTML elements as well as has video objects.

In the following example, the media player is specified to be a flash player, and the video link is specified as an URL for the flash file that is to be retrieved from the web site. Here, in this example, the HTML video code may be:

```
<div class="top-story-content single videoplayer videoplayer-fpp09 videoplayer-show">
<object type="application/x-shockwave-flash"
data="http://assets.realtor.go.com/realtorvideo/mpf32/prod/r_3_2_0_14/REALTOR_Player.swf?
id=5917551" height="324" width="576" id="videoPlayer">_</object> </div>
```

And the HTML code for a non-video element, here containing two embedded links, may be:

```
<div class="col-left">
...... <img align="left" style="float:left;padding: 0pt 5px 0pt 0pt;"
src="http://a.realtorcdn.com/i/house/3283.jpg">
...... <a name="&1pos=fp_columnist"
href="http://a.realtor.cdn.com/pdf/3283/description.pdf">'......</div>
```

In one embodiment, the control browser proxy (112) in module (104) may modify these embedded links by preprending its own IP address before passing on this HTML code to the client app (200) in control browser client (106). Again assuming that the control browser proxy (112) IP address is 192.168.0.10, the HTML code after the pre-pending operation (210) will look as follows:

```
<div class="top-story-content single videoplayer videoplayer-fpp09 videoplayer-show">
<object type="application/x-shockwave-flash"
data="http://192.168.0.10/assets.realtor.go.com/realtorvideo/mpf32/prod/r_3_2_0_14/REALTO
R_Player.swf?id=5917551" height="324" width="576" id="videoPlayer">_</object> </div>
<div class="col-left">
...... <img align="left" style="float:left;padding: 0pt 5px 0pt 0pt;"
src="http://192.168.0.10/a.realtorcdn.com/i/house/3283.jpg">
...... <a name="&1pos=fp_columnist"
href="http://192.168.0.10/a.realtor.cdn.com/pdf/3283/description.pdf">'......</div>
```

In some embodiments video browser client server (140) may reside in a hardware platform that is different from the hardware platform used to house the control browser proxy (112). In such cases, the video browser client server (140) and the control browser proxy (112) may have different IP addresses associated with them. In this situation, the control browser proxy (112) may create two versions or modifications of the HTML code (132). One HTML code version that is targeted for the control browser client (106) may have the embedded links of HTML code (132) modified with the IP address of control browser proxy (112). The second HTML code version targeted for the video browser client (138) may generally have its embedded links modified with the IP address for the video browser client server (140).

The client app (200) in control browser client (106) receives this HTML code and presents it to the embedded browser (202) which renders the data, producing the displayed results (127). Since the embedded links are prepended with the IP address of the control browser proxy (112), in the case where the user selects any embedded link, the request again, just as a part of normal browser processing, will get issued to the control browser proxy (112), (212) by the control browser client (106) embedded browser (202). Thus, due to pre-pending of the embedded links by the IP address of the control browser proxy (112), the browser proxy gets introduced (or becomes) as a "man-in-the-middle" device with respect to out bound requests to web server (116). This allows the control browser proxy (112) to achieve two desirable functions—1) allow buffering (134) of the accessed HTML code and data associated with the embedded files (102), (120) within accessed HTML pages (132), which can be later used for making this data available to the video browser client (138), thus avoiding duplicate requests out to the web server (116) and also allow associating the selected non-video elements (120) and video objects (102) with the corresponding HTML code (132).

Communication of HTTP requests generated by embedded browsers (202) and (223) to control browser proxy (112) requires that networking interface of hardware platform housing the control browser proxy (112) allow HTTP requests to be forwarded to the control browser proxy (112).

In an alternate implementation, the communication of HTTP requests from client app (200) and display app (225) can be done using a proprietary communication mechanism over communication interfaces (128) and (129). In such embodiment, client app (200), using the built-in capabilities of the embedded browser (202) may command the embedded browser (202) to notify the client app for every outbound HTTP request. Similarly the display app (225), using the built-in capabilities of the embedded browser (223) may command the embedded browser (223) to notify it for every outbound HTTP request. These requests then can be communicated by the client app (200) or display app (225) to the control browser proxy (112) using a proprietary protocol over communication interfaces (128), (129).

The use of a private communication channel for HTTP protocol has some benefits. This method allows for deployments where the IP address associated with the control browser proxy (112) is either the same as the control browser client (106) or video browser client (138), and this method also avoids any conflicts with making control browser proxy (112) an HTTP server on a given hardware platform.

Control browser proxy (112) then extracts the HTTP request from the proprietary message sent by the client app (200). In situations where the HTTP request to an external web server (116), the control browser proxy (112) sends out the request to the external web server (116). The received HTML code from the external web server (116) may be modified to ensure that the future requests are again first presented to the client app (200) for fetching from the external web server (116). Generally embedded browser (202) on its own will not go out and fetch the HTTP request directly. Again, for most of the HTTP links, using the built in "request delegation" mechanisms, the embedded browser can be made to present the request to the client app (200), instead of sending the request out by itself. However, special handling may be needed for redirecting the embedded links associated with video objects. In case of video objects, the browser processing of objects can typically handle standard file access protocols, for example HTTP and FTP etc.

As described earlier, since we want the video file data to first arrive to the control browser proxy (112), and we will generally want to avoid any conflicts in making browser-proxy (112) the default HTTP or FTP server for a given hardware platform, we may modify the default video object with a modified video object that allows using a proprietary protocol for communication over communication interface (128). This modification may be achieved by creating a proprietary video object. By routing the video file fetching through the control browser proxy (112), the system is to buffer the video file data, and make this data available to display app (225).

If the user uses selection control (136) to project the same video on the large video display (100)), then in response to fetching of the video object by the display app (225), the modified video object causes the video file to be fetched from the control browser proxy (104) instead of from the external web server (116). The video file is then presented to the display app (225). Controlling the video on the large video display (100) from the client app (200):

In the embodiment where the same type of media player (222), (122) is played in both the control browser client (106) and the video browser client (138), the control client application (200) can be designed so that the coordinates of the user control button selection (142) within the video object being rendered by the first video media player (222) can be mapped to the corresponding relative coordinates within the video object rendered by the second medial player (122). This allows the same control button (144) to be selected on the second video division as well. In this scheme, the coordinates of the user control button selection (142) used to control the first video (126) being rendered by the first video media player (222) are intercepted, and these mapped relative coordinates are computed and transmitted (146) from the first media player (222) to the second media player (122) running in the video browser client (138). This allows the user to easily control the playback of, for example, the house walk-through video (126) on the large video display (100).

It should be evident that the methods of the invention can be embodied in various physical devices. For example, in one configuration, the video browser client (138) may be embedded in the same hardware platform as the web browser proxy (104). This configuration might be used in a set top box that in turn is used to control the large video display (100). Alternatively, the video browser client (138) and the web browser proxy (104) might be embedded in separate hardware platforms. In another configuration, the video browser client (138) and the web browser proxy (104) might both be embedded in the same hardware platform as the large video display (100). In yet another configuration, some of the modules of web browser proxy (104), for example, video browser client server (140) may be implemented in the same hardware platform as that of video browser client (138) while other modules, including control browser proxy (112) may be implemented in the same hardware platform as that of control browser client (106). Many other different physical configurations are also possible.

One advantage of this approach is that often large video displays (100) can display video at both much higher resolutions than small handheld devices (106), and also can display 3D video content as well. In some embodiments of the invention, if the web browser proxy (104) knows (e.g. instructed by previous setup, or by direct interrogation of video display (100)) that the large video display is 3D capable, then either before user selection or upon user selection of a video of interest (126), the web browser proxy can optionally request enhanced 3D video objects (data) (102) from the server (116), and the large video display (100) can in turn show higher resolution or 3D video content, here symbolized by 3D glasses (148).

Thus for example, a real estate broker might control a conference room large video screen (100) from his or her smart phone (106), and take clients though immersive 3D walkthroughs through houses of interest, by simply selecting videos of interest (126) by appropriate touching of suitable video boxes and controls on his or her smart phone. Since the playback of the video on the smart phone (106) can be synchronized with the playback of the video on the large video display (100) by appropriate synchronization hardware or software (150), and by sending commands (146) that echo the user presses on the small media player (126), (142), then the user can pause the playback on the large video at any time, and restart, playback and so on, knowing that the two displays (100), (126) will be properly synchronized.

Handling of Secure (HTTPS) Requests:

Often, for enhanced security, many websites communicate using public key encrypted web pages or other HTML encrypted pages, for example using the HTTPS protocol. In the embodiment where client application (200) pre-pends the IP address of the browser proxy to the user provided URL (130), the embedded browser (202) in the client app is still presented with an HTTP request, but in this case in addition to pre-pending only the browser proxy's IP address, the additional directive "/https/" (or it could an any other directive that is understood by the browser proxy to imply requesting https connection to the web server instead of an http connection) is placed after the browser proxy's IP address. For our earlier example where the browser proxy has an example IP address of 192.168.0.10, the user's requests to connect to www.realtor.com with an HTTPS connection is presented as an HTTP request to connect to 192.168.0.10/https/www.realtor.com with the embedded browser (202) in the client app (200). The web browser proxy (104), (112), (212), upon receiving the corresponding HTTP request creates an HTTPS request to www.realtor.com. Note that in this case, the communication between the embedded browser in the client app (202) and control browser proxy (112) does not happen using a secure connection.

In an embodiment where HTTP requests are sent by client app (200) and display app (225), and not by the corresponding embedded browsers (202), (223), the client app (200) and display app (225) may optionally employ their own mechanism for secure communication with the control browser proxy (104).

The HTTPS communication standard was designed for enhanced security, and to resist "man in the middle" attacks. It often requires cryptographic exchange of various public keys. Here, the web browser proxy (104) acts somewhat as a man-in-the-middle, although it is generally a trusted man-in-the-middle, and as a result, some browser modifications may be useful in order to have the system function adequately function with secure information.

In some embodiments, it may be useful to make the embedded browser (202) something other than a closed secure standard browser (i.e. embedded Chrome, Safari, Firefox, IE, etc.). In particular, it may be useful to use a non-standard embedded browser (202) that has been designed or modified so as to share its public key information with at least other elements of the system such as the web browser proxy (104) and/or the video browser client (138). This will allow these other modules to also intercept data going between the control browser client (106) and web server (116). This is acceptable as long as the "man-in-the-middle" is "our" (trusted) man-in-the-middle.

Note that in the case where the client app (200) has full control of all the communications to the other modules of the system, there is no need to modify the URL specified by the user to pre-pond the IP address of the browser proxy. In this case, the client app can simply encapsulate any outbound message and can route it to control browser proxy (104) explicitly. By the same token, in this situation, the web browser proxy (104) does not need to modify the embedded link to include its own IP address.

IP address discovery of browser proxy by client application and video browser client:

Since often the web browser proxy (104), the control browser client module (106) and video browser client (138) are components of the same overall solution, they may exchange any type of data, including each module's IP address, by any proprietary method, or by using an industry standard IP address and capabilities discovery of the devices on a network. The three modules may also exchange their (different) IP addresses through an external internet server; here termed a "configuration server".

For example, by using a configuration server, a common login account can be used to provide the binding between the different modules—that is all can know that they belong to the same user with the same ID, and using the configuration server, they can all exchange their IP addresses in this manner.

Thus in one embodiment of a configuration server based approach for discovering the identity and the IP addresses associated with the various modules, each of the modules (after initialization) can present the user with a choice to login into an existing configuration account on a web site corresponding to the configuration server, or to create a new configuration account. The module can then send its own identity and IP information to the configuration account specified by the user. In this way, IP addresses of all of the modules associated with a configuration account become associated with the configuration account, and with each other.

Synchronization of the rendered web page between the control browser client and video browser client:

Generally, it will be useful for the control browser proxy (112) and video browser client server (140) to synchronize the downloading of data to both the control browser client (106) and the video browser client (138) so that web page and video appear time synchronized between the two. In some cases, such as where the two devices have different time delays, it may be necessary for the web browser proxy to synchronize the video browser client server (140), (which controls the rate of playback of data from buffer (134) to the video client browser module (138) and hence to large video display (100)), with the web browser proxy (112) that is sending data to the control browser client (106). Often this synchronization process can be done by way of synchronization software or device (150). For video play back on the media players (222) and (122) in the client app (200) and video browser client (138), for example, this can be accomplished by ensuring that the each of the media players (222), (122) receives the video file data starting with the same video frame. This can also be accomplished by methods such as a synchronization process (150) that keeps track of the time lapsed in the video stream played on the control browser client (106) at the time of selection control (136) that initiates the mirroring of the video stream on the video browser client (138). The synchronization process (150) can additionally, be programmed or set to compensate for other factors, such as different time delays between device (106) and devices (138), (100).

Thus to generalize, in some embodiments of the invention, the control browser proxy (104) will time or video frame synchronize the sending of the processed non-video elements and video objects to the control browser client (106) with the sending of the selected processed non-video elements and selected video objects to the video browser client (138) and the video display (100). This will thus produce time or video frame synchronized images and video between the control browser client (106) and video display (100).

In some embodiments, it may be useful to implement the embedded browser (202) as a minimal functionality or non-standard "thin" browser in the control browser client (106), rather than as a general purpose or fully featured standard web browser.

FIG. 3 shows some additional details of how rich media (e.g. high definition video, 3D video) or media with security issues may be safely run on thin control browser clients (320) by pre-rendering web pages on more full featured browsers (310) in the web browser proxy (104), compressing the results (312), and sending the compressed images to the thin control browser (320) part of client app (200) in control browser client (106), which in turn may decompress and display the rich media.

More specifically, in some situations, as previously discussed, rather than sending all of the requested HTML code from the server (116) to the control browser client (106), and then running the HTML in a full featured embedded browser (202), it may be useful to make the embedded browser (202) a thin embedded browser (320) that only implements a limited subset of HTML, possibly supplemented by a few additional custom tags or commands. In this scheme, some or all of the web page may be pre-rendered by a full featured browser (310) in web browser proxy (104), and the resulting images (often compressed by various lossy and non-lossy methods to reduce bandwidth and memory requirements (310)) then transmitted to the control browser client (106).

For example, in one scheme, the first non-video elements processing protocol can be a lossless compression protocol (e.g. a PNG, TIFF, WAV, LZW, JPEG 2000, FFV1 protocol or a light weight proprietary protocol). After at least part of the non-video elements have been rendered into a rendered image (or sound and video as well) on the browser proxy using a full featured browser (310), this rendered data (often called a frame because often video frames may be handled in this manner) may be compressed using either lossy or lossless compression (312). Here lossless compression will be used as a specific embodiment.

In this embodiment, after the full featured web browser (310) has produced a rendered image, (312) performs lossless image compression producing a lossless compressed image, at least for the web pages various non-video elements. This compressed image, which may for example be most or all of a web page, but with divisions in which a video media player might play video, can then be transmitted (128) to the control browser client (106), where the image can be decompressed by the application software (200) and thin embedded browser (320), and then displayed on the graphical user interface (108). In one extreme example, the thin embedded browser (320) could consist of little more than software to render the decompressed web page image, and a media player (222) to play the video (126) alongside this decompressed web page image. Thus thin embedded browser (320) can be anything between an extremely limited or thin web browser, up to and including a full-featured web browser. This pre-rendering process on the web browser proxy (104) can thus be helpful because it can allow problematic applications with power consumption or security concerns, such as Adobe Flash, to be run in a protected or "sandbox" environment on the web browser proxy (104), and at the same time reduce power and code space needs on the control browser client (106).

In addition to functions such as pre-rendering the non-video elements (120) of web pages and compressing them, the web browser proxy (104) may also compress the video portions of web pages (video objects) (102) as well. This feature may be particularly useful when the general intent is to view high definition video and/or 3D video on the large video display (100), and thus high bandwidth video is being requested from server (116). In order to reduce the computational load that would otherwise be required to play this high definition video on the control browser client (106), this video may be first compressed down to a lower bandwidth format by the web browser proxy (104), and then retransmitted.

In one embodiment of this method, the first video objects processing protocol can compress the video objects (102) to fit into a smaller number of bytes per second than the second video objects processing protocol (which is sending data to video display (100)), thus producing a higher resolution video image on video display (100) than is displayed on the graphical user (108) interface of the control browser client (106). Put simply, the small video (126) being played on device (106) can thus be lower bandwidth and lower resolution than the large video being played on video device (100).

Returning to the topic of encryption, in order to accommodate receiving encrypted web pages using HTTPS protocol all the way to control browser client for privacy and security considerations, and projecting this data from public key encrypted web pages on a large video screen (100), the encryption keys or other HTML encryption key may need to be shared between the control browser client (106) (e.g. the smart phone) and other modules in the system, such as the web browser proxy (104) and the video browser client (138).

In these embodiments, when a thin embedded browser (320) is used, the thin embedded browser may be designed or modified so as to share its encryption public key information with at least other elements of the system such as the web browser proxy (104) and/or the video browser client (138). This sharing process will allow these other modules to also intercept data going between the control browser client (106) and web server (116).

This embodiment also provides the capability to project Digital Rights Management (DRM) protected videos from the control browser client (106) to video browser client (138). In this case, the DRM protected video can be first played using a media player on control browser proxy (104) and then the un-encrypted video data can be played on control browser client (106) and the video browser client (138).

A customized or thin embedded browser (320) can also be useful for achieving an increased level of synchronization between the video (126) rendered by client app (200) using media player (222), and video rendered by the video browser client (138) using media player (112). Here a custom or thin embedded browser (320) can be configured to also provide the information (146) of the active frame information directly to the video browser client (138) to achieve more precise video synchronization between media players (222) and (122).

FIG. 4 adds another capability to the web browser-proxy system and method. This is the capability of displaying additional content to large video display (100) once part of the content that is displayed on client app (200) is projected to the display app (225). One application of this additional capability is to allow displaying advertisements on the large video display (100) that may not be suitable (due to screen size limitations) to display on the smaller display screen associated with client app (200).

Such functionality may be achieved by using control browser proxy (104) to obtain additional HTML code (410) (132) from web server (116). This HTML code (410) may be code that represents extra content media (400) that is only displayed on large video display (100) after client app (200) has initiated projecting or mirroring of some of the some of the HTML code rendered on client app (200). In response to selection control (136) to initiate the projection of some of the content rendered on client app (200), when the display app (225) requests HTML code from control browser proxy (104), the control browser proxy (104) may also provide additional HTML code (410) (for this extra media content) to display app (225), which then using its embedded browser (223) and media player (122) displays this additional content, extra content (400) on large video display (100).

Additional HTML code (410) may be indicated as special content that is meant only for rendering on the large video display (100) by the use of additional tags or directives in the HTML code. This additional HTML code can also indicate any timing information or other conditions required for displaying the additional HTML code (410) on large video display (100). For example, there may be a directive embedded in the additional HTML code that indicates that the additional HTML code (410) containing extra content (400) should only be displayed after the requested video projected on large video display ends. For example, a commercial video could be shown at the end of the requested video.

Another additional HTML code directive may indicate that after every pre-specified duration, (e.g. every 5 minutes), of playing the requested projected video on the large video display (100), additional media content (400) specified by the additional HTML code (410) may be rendered on large video display for a set period of time (e.g. a 15 second commercial). This way additional revenue through displaying additional advertisements on large video display (100) may be realized. In some cases additional HTML code (410) may contain additional informational content (400) associated with the video being rendered on large video display (100).

ALTERNATE EMBODIMENTS

Several other embodiments are also contemplated by the inventor. For example, while simple examples have been shown to facilitate understanding, more complex situations can also be handled by the methods described here.

Although in many embodiments, the method will obtain both the video objects (102) and the non-video objects (video elements data) (120) through the same network connection, such as the same internet connection (118), this does not always need to be the case. In some embodiments, at least some of the video objects (102) may be transmitted to the control browser proxy (104) using a different network connection than at least some of the non-video elements (102).

As previously discussed, in some embodiments of the invention, the control browser client (106) may additionally display extra selection controls (136) in the graphical user interface (108) that can allow the user to further control the selection and display on video display (100) of the non-video elements and video objects. In addition to normal button or hot spot areas that can be controlled by finger presses on a pressure sensitive display screen or by mouse commands, in some embodiments, real or virtual keyboard (110) or even voice commands may also be used for control of the video on video browser client (138) and large video display (100).

Note again that the control browser client (106) may be run a wide variety of computerized devices equipped with monitors, including for example common desktop computers.

There may be alternate user interface options for selection controls (136) that may be employed without changing the intent of the invention described here. For example, instead of selecting a tab for initiating operation to project video to large display (100), an action of a touch stroke over the video playing in the media player (222) in the client app (200) may indicate the intention of projecting the video to the large display (100).

Additionally, the synchronization mechanism between the video rendering done by media player (222) and (122) may involve browser proxy letting the video data buffer of the media player (222) discard a portion of the video data (i.e. discard certain video frames), and then to start sending the video file data to both client app (200) and display app (225) from the same frame.

The invention claimed is:

1. A method of implementing a video display using a web browser proxy, a control browser client, and a video browser client, said method comprising:

using a web browser proxy to obtain HTML code from an Internet web page server;

said HTML code comprising non-video elements and video objects;

wherein said web browser proxy is remotely controlled by a control browser client with a graphical user interface in a separate hardware platform, said control browser client being capable of taking control commands from a user, and sending said control commands to said web browser proxy;

using said control browser client to request said web browser proxy to request and receive said HTML code from said Internet web page server;

using said web browser proxy to process said non-video elements using a first non-video elements processing protocol, and to process said video objects using a first video objects processing protocol, producing processed non-video elements and processed video objects;

sending said processed non-video elements and said processed video objects to said control browser client;

rendering said processed non-video elements and said processed video objects on the graphical user interface of said control browser client;

using said control browser client to accept user commands to select at least some of said non-video elements or video objects and transmit said selection to said web browser proxy;

using said web browser proxy to process the selected non-video elements or video objects using a second non-video elements processing protocol for the said selected non-video elements, and a second video objects processing protocol for said selected video objects;

wherein said web browser proxy stores at least one of said non-video elements or said video objects in a memory storage buffer;

said web browser proxy sends said selection to a video browser client;

said video browser client requests said selection from said memory storage buffer; and said video browser client renders said selected processed non-video elements or said selected processed video objects on said video display.

2. The method of claim 1, wherein said control browser client renders at least said processed video objects in the graphical user interface of said control browser client using a first video media player;

and wherein said video browser client renders at least said selected processed video objects using a second video media player;

wherein the position of video media player controls in said first video media player can be mapped into the position of video media player controls in said second video media player;

and wherein user graphical user interface commands to control the operation of said first video media player in said control browser client are transmitted to said second video media player and are used to control the operation of said second media player in said video browser client.

3. The method of claim 1, wherein said video browser client and said web browser proxy are embedded in the same hardware platform.

4. The method of claim 1, wherein said video browser client and said web browser proxy are embedded in separate hardware platform.

5. The method of claim 1, wherein said video browser client or said web browser proxy or a combination of said video browser client and said web browser proxy are embedded in the same hardware platform as said video display.

6. The method of claim 1, wherein said video display is a 3D video display, and wherein if said Internet web page server additionally has 3D video objects corresponding to said selected video objects, using said control browser client to request said 3D video objects and display said 3D video objects on said video display.

7. The method of claim 1, wherein if said Internet web page server has additional video objects and/or additional non-video elements to show in addition to said selected video objects and/or said non-video elements, using said control browser client to request said additional video objects and/or said additional non-video elements and display said additional video objects and/or said additional non-video elements on said video display.

8. The method of claim 1, wherein said control browser client is designed to share HTML encryption key with said web browser proxy, thus enabling the web browser proxy to decrypt and interpret https and other encrypted data formats being transferred between said web browser client and said Internet web page server.

9. The method of claim 1, wherein said web browser proxy and control browser client have different internet protocol (IP) addresses; and wherein said web browser proxy and said control browser client exchanges said different internet protocol addresses using an external IP discovery server.

10. The method of claim 1, wherein said first non-video elements processing modifies embedded links in said non-video elements producing modified non-video elements;

said modified non-video elements is transmitted to said control browser client; and wherein said modified non-video elements is rendered on the graphical user interface of said control browser client.

11. The method of claim 1, wherein said second non-video elements processing modifies embedded links in said video objects, producing modified video objects;

said modified video objects is transmitted to said control browser client; and wherein said modified video objects is rendered on the graphical user interface of said control browser client.

12. The method of claim 1, wherein said first non-video elements processing protocol is a lossless image compression protocol that first renders at least part of the said non-video elements on said web browser proxy into a rendered image, and then performs lossless image compression on said rendered image producing a lossless compressed non-video page image; and wherein said lossless compressed non-video page image is transmitted to said control browser client, decompressed by said control browser client, and displayed on said graphical user interface.

13. The method of claim 1, wherein said selected non-video elements are rendered on said web browser proxy into at least one selected image; and said at least one selected image is displayed by said video display.

14. The method of claim 13, wherein said second non-video elements processing protocol is a lossless image compression protocol;

Wherein at least part of said one selected image is compressed using said second non-video elements processing protocol, thereby producing at least one compressed selected image; and wherein said at least one compressed selected image is transmitted to said video display, decompressed, and displayed by said video display.

15. The method of claim 1, wherein said first video objects processing protocol is a null operation protocol; and wherein said video objects is transmitted to said control browser client, rendered by said control browser client, and displayed on said graphical user interface.

16. The method of claim 1, wherein said first non-video page processing protocol is a null operation protocol; and wherein said non-video elements is transmitted to said control browser client, rendered by said control browser client, and displayed on said graphical user interface.

17. The method of claim 1, wherein said first video objects processing protocol compresses said video objects to fit into a smaller number of bytes per second than said second video objects processing protocol, thus producing a higher resolution video image on said video display than is displayed on the graphical user interface of said control browser client.

18. The method of claim 1, wherein said web browser proxy time-synchronizes the sending of said processed non-video elements and video objects to said control browser client with the sending of said selected processed non-video elements and selected video objects to said video browser client;
thus producing time synchronized images between said control browser client and said video browser client.

19. The method of claim 1, wherein said control browser client is run on a smart phone, tablet computer, laptop personal computer, personal computer, or remote control.

20. The method of claim 1, wherein said web browser proxy sends said selected processed non-video elements or said selected processed video objects to a set top box, which in turn converts said selected processed non-video elements or said processed video objects to a format that can be displayed by said video display.

21. The method of claim 1, wherein said web browser proxy is embedded in a set top box.

22. The method of claim 1, wherein said web browser proxy is embedded in the said video display.

23. The method of claim 1, wherein at least some of said video objects may be transmitted to said web browser proxy using a different network connection than at least some of said non-video elements.

24. The method of claim 1, wherein said control browser client additionally displays control elements on said graphical user interface to allow said user to further control the selection and display on said video display of said non-video elements and said video objects.

25. The method of claim 1, wherein said control commands comprise one or more commands selected from the group consisting of keyboard commands, mouse commands, voice commands, and presses on a pressure sensitive graphical user interface.

26. A method of implementing a video display using a web browser proxy, video browser client and control browser client, said method comprising:
using a web browser proxy to obtain HTML code from an Internet web page server;
said HTML code comprising non-video elements and video objects;
wherein said web browser proxy is controlled by a control browser client with a graphical user interface, said control browser client being capable of taking control commands from a user, and sending said control commands to said web browser proxy;
using said control browser client to request said web browser proxy to request and receive said HTML code from said Internet web page server;
using said web browser proxy to process said non-video elements using a first non-video elements processing protocol, and to process said video objects using a first video objects processing protocol, producing processed non-video elements and processed video objects;
sending said processed non-video elements and said processed video objects to said control browser client;
rendering said processed non-video elements and said processed video objects on the graphical user interface of said control browser client;
using said control browser client to accept user commands to select at least some of said non-video elements or video objects and transmit said selection to said web browser proxy;
using said web browser proxy to process the selected non-video elements or video objects using a second non-video elements processing protocol for the said selected non-video elements, and a second video objects processing protocol for said selected video objects;
sending said selected said processed non-video elements and said processed video objects to a remote said video browser client in a separate hardware platform; and
resulting in said video browser client rendering said selected processed non-video elements or said selected processed video objects on said video display.

27. The method of claim 26, wherein said web browser proxy stores at least one of said non-video elements or said video objects in a memory storage buffer;
said web browser proxy sends said selection to a said video browser client;
said video browser client requests said selection from said memory storage buffer; and
said video browser client renders said selected processed non-video elements or said selected processed video objects on said video display.

28. The method of claim 27, wherein said control browser client renders at least said processed video objects in the graphical user interface of said control browser client using a first video media player;
and wherein said video browser client renders at least said selected processed video objects using a second video media player;
wherein the position of video media player controls in said first video media player can be mapped into the position of video media player controls in said second video media player;
and wherein user graphical user interface commands to control the operation of said first video media player in said control browser client are transmitted to said second video media player and are used to control the operation of said second media player in said video browser client.

29. The method of claim 26, wherein said video browser client and said web browser proxy are embedded in separate hardware platform.

30. The method of claim 26, wherein said video browser client is embedded in a set-top box or video display.

31. The method of claim 26, wherein said video display is a 3D video display, and wherein if said Internet web page server additionally has 3D video objects corresponding to said selected video objects, using said control browser client to request said 3D video objects and display said 3D video objects on said video display.

32. The method of claim 26, wherein if said Internet web page server has additional video objects and/or additional non-video elements to show in addition to said selected video objects and/or said non-video elements, using said control browser client to request said additional video objects and/or said additional non-video elements and display said additional video objects and/or said additional non-video elements on said video display.

33. The method of claim 26, wherein said web browser client compromises a video browser client server module and a control browser proxy module;

and wherein said video browser client server module and said control browser proxy module are implemented on different hardware platforms.

* * * * *